United States Patent
Taylor et al.

(10) Patent No.: US 8,140,424 B2
(45) Date of Patent: Mar. 20, 2012

(54) METHOD AND SYSTEM TO IMPLEMENT SELLER AUTHORIZED BUYING PRIVILEGES WITHIN A NETWORK-BASED SHOPPING FACILITY

(75) Inventors: Jeffrey Taylor, Los Altos, CA (US); Noel Morin, Boulder Creek, CA (US); Annette Goodwine, Burlingame, CA (US); Vicky Sze, Santa Clara, CA (US); Kevin W. Cooney, Scotts Valley, CA (US); James Hsin, San Jose, CA (US); Elaine Fung, Cupertino, CA (US); Vered Shaviv, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1105 days.

(21) Appl. No.: 11/852,868

(22) Filed: Sep. 10, 2007

(65) Prior Publication Data

US 2008/0052218 A1 Feb. 28, 2008

Related U.S. Application Data (63) Continuation of application No. 09/881,911, filed on Jun. 15, 2001, now Pat. No. 7,299,206.

(60) Provisional application No. 60/250,637, filed on Nov. 30, 2000.

(51) Int. Cl.
*G06F 30/00* (2006.01)
(52) U.S. Cl. ........................ 705/37; 705/26.3; 705/26.35
(58) Field of Classification Search .................... 705/37, 705/26.3, 26.35, 27, 26
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,865,516 A | 9/1989 | Focke et al. |
| 4,903,201 A | 2/1990 | Wagner |

(Continued)

FOREIGN PATENT DOCUMENTS

CA 2253543 3/1997

(Continued)

OTHER PUBLICATIONS

Googlegroups, Robert Edward Auction on Ebay of Wagner card, 9 pages, dated Jul. 7, 2000.*

(Continued)

*Primary Examiner* — Mark Fadok
(74) *Attorney, Agent, or Firm* — SChwegman, Lundberg & Woessner, P.A.

(57) ABSTRACT

A method that commences by receiving a bid for a particular sales listing from a first bidder that is not pre-approved to bid on the particular sales listing. The method continues by restricting the bid for the particular sales listing from the bidding process associated with the particular sales listing, the restricting based on the requirement of the first bidder to be pre-approved to bid on the particular sales listing.

20 Claims, 12 Drawing Sheets

U.S. PATENT DOCUMENTS

| | | | |
|---|---|---|---|
| 5,063,507 | A | 11/1991 | Lindsey et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |
| 5,280,422 | A | 1/1994 | Moe et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,325,297 | A | 6/1994 | Bird et al. |
| 5,329,589 | A | 7/1994 | Fraser et al. |
| 5,375,055 | A | 12/1994 | Togher et al. |
| 5,394,324 | A | 2/1995 | Clearwater |
| 5,426,281 | A | 6/1995 | Abecassis |
| 5,485,510 | A | 1/1996 | Colbert |
| 5,553,145 | A | 9/1996 | Micali |
| 5,557,728 | A | 9/1996 | Garrett et al. |
| 5,596,994 | A | 1/1997 | Bro |
| 5,598,557 | A | 1/1997 | Doner et al. |
| 5,640,569 | A | 6/1997 | Miller et al. |
| 5,657,389 | A | 8/1997 | Houvener |
| 5,664,115 | A | 9/1997 | Fraser |
| 5,689,652 | A | 11/1997 | Lupien et al. |
| 5,694,546 | A | 12/1997 | Reisman |
| 5,706,457 | A | 1/1998 | Dwyer et al. |
| 5,710,889 | A | 1/1998 | Clark et al. |
| 5,715,314 | A | 2/1998 | Payne et al. |
| 5,715,402 | A | 2/1998 | Popolo |
| 5,717,989 | A | 2/1998 | Tozzoli et al. |
| 5,722,418 | A | 3/1998 | Bro |
| 5,727,165 | A | 3/1998 | Ordish et al. |
| 5,771,291 | A | 6/1998 | Newton et al. |
| 5,771,380 | A | 6/1998 | Tanaka et al. |
| 5,790,790 | A | 8/1998 | Smith et al. |
| 5,794,219 | A | 8/1998 | Brown |
| 5,799,285 | A | 8/1998 | Klingman |
| 5,803,500 | A | 9/1998 | Mossberg |
| 5,818,914 | A | 10/1998 | Fujisaki |
| 5,826,244 | A | 10/1998 | Huberman |
| 5,835,896 | A | 11/1998 | Fisher et al. |
| 5,845,265 | A | 12/1998 | Woolston |
| 5,845,266 | A | 12/1998 | Lupien et al. |
| 5,850,442 | A | 12/1998 | Muftic |
| 5,862,223 | A | 1/1999 | Walker et al. |
| 5,872,848 | A | 2/1999 | Romney et al. |
| 5,873,069 | A | 2/1999 | Reuhl et al. |
| 5,884,056 | A | 3/1999 | Steele |
| 5,890,138 | A | 3/1999 | Godin et al. |
| 5,905,974 | A | 5/1999 | Fraser et al. |
| 5,905,975 | A | 5/1999 | Ausubel |
| 5,922,074 | A | 7/1999 | Richard et al. |
| 5,924,072 | A | 7/1999 | Havens |
| 5,926,794 | A | 7/1999 | Fethe |
| 5,974,412 | A | 10/1999 | Hazlehurst et al. |
| 5,991,739 | A | 11/1999 | Cupps et al. |
| 6,012,045 | A | 1/2000 | Barzilai et al. |
| 6,035,288 | A | 3/2000 | Solomon |
| 6,035,402 | A | 3/2000 | Vaeth et al. |
| 6,044,363 | A | 3/2000 | Mori et al. |
| 6,047,264 | A | 4/2000 | Fisher et al. |
| 6,055,518 | A | 4/2000 | Franklin et al. |
| 6,058,417 | A | 5/2000 | Hess et al. |
| 6,061,448 | A | 5/2000 | Smith et al. |
| 6,073,117 | A | 6/2000 | Oyanagi et al. |
| 6,081,789 | A | 6/2000 | Purcell |
| 6,085,176 | A | 7/2000 | Woolston |
| 6,104,815 | A | 8/2000 | Alcorn et al. |
| 6,119,137 | A | 9/2000 | Smith et al. |
| 6,178,408 | B1 | 1/2001 | Copple et al. |
| 6,189,003 | B1 | 2/2001 | Leal |
| 6,192,407 | B1 | 2/2001 | Smith et al. |
| 6,199,050 | B1 | 3/2001 | Alaia et al. |
| 6,202,051 | B1 | 3/2001 | Woolston |
| 6,240,396 | B1 | 5/2001 | Walker et al. |
| 6,243,691 | B1 | 6/2001 | Fisher et al. |
| 6,578,014 | B1 | 6/2003 | Murcko, Jr. |
| 6,947,906 | B1 * | 9/2005 | Underwood et al. ........... 705/37 |
| 7,376,612 | B1 * | 5/2008 | Kwan ............................. 705/37 |
| 7,689,469 | B1 * | 3/2010 | Mesaros ..................... 705/26.1 |
| 7,966,243 | B2 | 6/2011 | Taylor et al. |
| 2001/0049634 | A1 | 12/2001 | Stewart |
| 2002/0007338 | A1 | 1/2002 | Do |
| 2002/0013760 | A1 | 1/2002 | Arora et al. |
| 2002/0042755 | A1 | 4/2002 | Kumar et al. |
| 2002/0049961 | A1 | 4/2002 | Fang et al. |
| 2002/0174060 | A1 | 11/2002 | Friedland et al. |

FOREIGN PATENT DOCUMENTS

| | | |
|---|---|---|
| FR | 2658635 | 8/1991 |
| NL | 9300266 | 2/1993 |
| WO | WO-9215174 | 9/1992 |
| WO | WO-9517711 A1 | 6/1995 |
| WO | WO-9634356 | 10/1996 |
| WO | WO-9737315 | 10/1997 |
| WO | WO-9963461 A1 | 12/1999 |

OTHER PUBLICATIONS

"International Search Report PCT/US00/17136", PCT/US00/17136.

"International Search Report PCT/US01/12398", PCT/US01/12398.

"Mediappraise Receives National Award For Web-based Technology That Enables Companies to Solve Thorny HR Problem", *Business Wire Press Release*, (Dec. 15, 1998),1-2.

"Onsale Joins Fray as Online Shopping Picks Up Speed: Internet Booms", *Computer Reseller News*, CMP Publications, Inc., USA,(Jun. 5, 1995),73.

"Onsale: Onsale Brings Thrill of Auctions and Bargain Hunting Online; Unique Internet retail service debuts with week-long charity auction for The Computer Museum in Boston", *Business Wire*, Dialog Web. 0489267 BW0022,(May 24, 1995),3 pages.

"Personal Optimized Decision/Transaction Program", *IBM Technical Disclosure Bulletin*, 38(1), (Jan. 1995),83-84.

Clemons, E , "Evaluating the prospects for alternative electronic securities", *Proceedings of ICIS 91: 12th International Conference on Information Systems*, (Dec. 16-18, 1991),53-61.

Epier.Com, "ePier.com Guidelines", http://www.wpier.com/Guidelines.asp, *Auctions*, (Mar. 9, 2001),9 pages.

Graham, I , "The Emergence of Linked Fish Markets in Europe", *Focus Theme*, 1-4.

Hauser, R , "Anonymous Delivery of Goods in Electronic Commerce", *IBM Technical Disclosure Bulletin*, 39(3), (Mar. 1996),363-366.

Hess, C M., et al., "Computerized Loan Organization System: An Industry Case Study of the Electronic Markets Hypothesis", *MIS Quarterly*, 18(3), (Sep. 1994),251-274.

Klein, S , "Introduction to Electronic Auctions", *Focus Theme*, 1-4.

Lee, H G., "AUCNET: Electronic Intermediary for Used-Car Transactions", *Focus Theme*, 1-5.

Lee, H. G., "Electronic brokerage and electronic auction: the impact of IT on market structures", *Proceedings of the Twenty-Ninth Hawaii International Conference on System Sciences*, vol. 4, (1996),397-406.

Malone, T W., et al., "Electrnic Markets and Electronic Hierarchies", *Communications of the ACM*, vol. 30(6), USA, (Jun. 1987),484-497.

Mardesich, Jodi "Site Offers Clearance for End-of-Life Products—Onsale Takes Auction Gavel Electronic", *Computer Reseller News*, (Jul. 8, 1996),2 pages.

Massimb, Marcel , "Electronic Trading, Market Structure and Liquidity", *Financial Analysts Journal*, 50(1), (Jan./Feb. 1994),39-50.

Meade, J. , "Visual 360: A Performance Appraisal System That's Fun", *HR Magazine*, Society for Human Resource Management. ,(Jul. 1999),44, 7, 2 pgs.

Neo, B S., "The implementation of an electronic market for pig trading in Singapore", *Journal of Strategic Information Systems*, 1(5), (Dec. 1992),278-288.

Post, D L., et al., "Application of auctions as a pricing mechanism for the interchange of electric power", *IEEE Transactions on Power Systems*, 10(3), (Aug. 1995),1580-1584.

Preist, Chris , "Adaptive Agents in a persistent shout double auction",

*International conference on Information and Computation Economies, Proceedings of the first international conference on Information and computation economies*, Oct. 25-28, 1998,11-18.

Reck, Martin , "Formally specifying an automated trade execution system", *Journal of Systems and Software*, 21(3), Elsevier Science Publishing Co., Inc. New York, NY, (Jun. 1993),245-252.

Reck, Martin , "Trading-Process Characteristics of Electronic Auctions", *Focus Theme*, 1-7.

Resnick, Paul , "Reputation systems", *Communications of the ACM*, 43(12), (Dec. 2000),45-48.

Rockoff, Todd , et al., "Design of an Internet-based system for remote Dutch auctions", *Internet Research: Electronic Networking Applications and Policy*, 5(4), (Jan. 1, 1995),10-16.

Schmid, B F., "The Development of Electronic Commerce", *Newsletter of the Competence Centre Electronic Markets*, No. 9/10, (Oct. 1993).

Siegmann, Ken , "Nowhere to Go but Up", *PC Week*, 12(42), Ziff-Davis Publishing Company,(Oct. 23, 1995),A5(1), 1-3.

Tjostheim, Ingvar , "A case study of an on-line auction for the World Wide Web", *Norwegian Computing Center* (NR), 1-10.

Turban, E , "Auctions and Bidding on the Internet: An Assessment", *Focus Theme*, 1-5.

Van Heck, E , "Experiences with Electronic Auctions in the Dutch Flower Industry", *Focus Theme*, 1-6.

Warbelow, A , et al., "Aucnet: TV Auction Network System", *Harvard Business School Case/Study*, HBVR#9-190-001, (Jul. 1989),1-15.

Yahoo, "Tahoo, http:user.auctions.yahoo.com, Options", http:user.auctions.yahoo.com, (Mar. 13, 2001),2 pages.

Zwass, Vladimir , "Electronic Commerce: Structures and Issues", *International Journal of Electronic Commerce*, 1(1), (Fall 1996),3-23.

"U.S. Appl. No. 09/881,911, Advisory Action mailed Nov. 2, 2005", 3 pgs.

"U.S. Appl. No. 09/881,911, Amendment under 37 C.F.R. 1.312 filed Jul. 10, 2007", 8 pgs.

"U.S. Appl. No. 09/881,911, Appeal Brief filed Dec. 7, 2005", 23 pgs.

"U.S. Appl. No. 09/881,911, Examiner's Answer to Appeal Brief mailed Feb. 8, 2006", 9 pgs.

"U.S. Appl. No. 09/881,911, Final Office Action mailed Aug. 5, 2005", 7 pgs.

"U.S. Appl. No. 09/881,911, Non Final Office Action mailed Mar. 4, 2004", 9 pgs.

"U.S. Appl. No. 09/881,911, Non Final Office Action mailed Oct. 6, 2003", 7 pgs.

"U.S. Appl. No. 09/881,911, Notice of Allowance mailed Jun. 15, 2007", 10 pgs.

"U.S. Appl. No. 09/881,911, Preliminary Amendment filed Jun. 2, 2003", 10 pgs.

"U.S. Appl. No. 09/881,911, Response filed Jan. 31, 2005 to Restriction Requirement mailed Sep. 29, 2004", 3 pgs.

"U.S. Appl. No. 09/881,911, Response filed Jul. 9, 2004 to Non Final Office Action mailed Mar. 4, 2004", 23 pgs.

"U.S. Appl. No. 09/881,911, Response filed Oct. 7, 2005 to Final Office Action mailed Aug. 5, 2005", 12 pgs.

"U.S. Appl. No. 09/881,911, Response filed Dec. 16, 2003 to Non Final Office Action mailed Oct. 6, 2003", 15 pgs.

"U.S. Appl. No. 09/881,911, Restriction Requirement mailed Sep. 29, 2004", 4 pgs.

"European Application Serial No. 01990829.2—Office Action Response filed Aug. 18, 2011", 5 pgs.

"International Application Serial No. PCT/US01/46426, International Preliminary Examination Report mailed Nov. 2, 2003", 3 pgs.

"International Application Serial No. PCT/US01/46426, International Search Report mailed May 31, 2002", 1 pg.

"U.S. Appl. No. 10/433,173, Non-Final Office Action mailed Sep. 9, 2008", 24 pgs.

"U.S. Appl. No. 10/433,173, Response filed Dec. 9, 2008 to Non-Final Office Action mailed Sep. 9, 2008", 15 pgs.

"U.S. Appl. No. 10/433,173, Final Office Action mailed Jan. 12, 2010", 22 pgs.

"U.S. Appl. No. 10/433,173, Non-Final Office Action mailed Mar. 24, 2009", 35 pgs.

"U.S. Appl. No. 10/433,173, Notice of Allowance mailed Feb. 10, 2011", 7 pg.

"U.S. Appl. No. 10/433,173, Response filed May 12, 2010 to Final Office Action mailed Jan. 12, 2010", 21 pgs.

"U.S. Appl. No. 10/433,173, Response filed Sep. 24, 2009 to Non Final Office Action mailed Mar. 24, 2009", 20 pgs.

"European Application Serial No. 01 990 829.2-2221, European Examination Report mailed Mar. 16, 2011", 6 Pgs.

Heins, F., ""Precautions can help keep auctions from being more than bargained for"" , The San Diego Union Tribune, (Aug. 31, 1999), 3 pgs.

Janah, M., "Bogus Offers Beset Online Auction Users Anonymity Shields Newer Scams. There'S No Central Reporting of Abuses, But Firms Say They're Exaggerated", Philadelphia Inquirer, (Aug. 19, 1999), 3 pgs.

Kollock, P., "The Production of Trust in Online Markets", http://www.sscnet.ucla.edu/socifaculty/killock/papers/online_rust.htm, (Sep. 3, 2008).

\* cited by examiner

Pre-Approve Bidders

Create your own pre-approved bidder list for any item and only allow those on your list to bid.
Please use this feature cautiously as it may limit the number of bids on your item.

Your User ID: 202
You can also use your email address

Your Password: 204
Forgot your password?

200

Are you tired of typing in your User ID and Password over and over again? Save time by signing in. (You may also sign in securely).

*FIG. 3*

Pre-Approve Bidders

300

Here's what you can do:

- To add and remove bidders from your list click Edit.
- To deactivate this feature and allow all users to bid click Deactivate.
- You and edit or deactivate your pre-approved bidder list up until your listing ends.

Items with Pre-Approved Bidders

| Item | Title | Time Left | Actions |
|---|---|---|---|
| 123456789 | Paul McCARTNEY's songs PIANO notes  302 | 0d 10h 50m | Edit  Deactivate  306  308 |
| 123456789 | Paul McCARTNEY's songs PIANO notes + lyrics  304 | Ended | View |

+ Add a new item with pre-approved bidders
310

*FIG. 4*

Pre-Approve Bidders

Edit Item

Edit your approved bidders in the box below. View tips to pre approve your bidders.

| Item No. | 12345678 402 |
|---|---|
| Add or remove pre-approved bidders | Enter each bidder's User's IDs. Place a comma between each User ID or just press the Enter key on your keyboard to display each name on a separate line. View an example.<br><br>vicky123<br>vicky12<br>vicky1<br>teddiedd  404<br>mickcik<br>johnre<br>mautau |

| PETER PAN URBANA, MARYLAND glass |
| :---: |
| Item #470476060 |

<u>Collectibles: Advertising: General</u>

| | | | |
|---|---|---|---|
| | Currently: | $20000.00 | First Bid $20000.00 |
| 504 | Quantity: | 1 | # of bids0 <u>bid history</u> \| <u>with emails</u> |
| | Time Left: | 4 days, 21 hours + | LocationBROADTOP, PA |
| | | | Country USA |

Started  Oct-16-00 11:43:21 PDT  ☐ <u>mail this auction to a friend</u>
Ends   Oct-21-00 11:43:21 PDT  ☐ <u>watch this item</u>
Seller
(Rating)  susan1073 (115) 🖃    <u>about me</u>
              502
    <u>view comments in seller's Feedback Profile</u> |
    <u>view seller's other auctions</u>| <u>ask seller a question</u>

High bid  --
Payment  See item description for payment methods accepted
Shipping  Will ship to United States only, See item description for shipping charges
Update item  Seller: If this item has received no bids, you may <u>revise</u> it.

| Description |
| :---: |

<item description>

*FIG. 6A* eB....21 PDT) - PETER PAN INN URBANA, MARYLAND glas Page 2 of 3

| BIDDING |  |
|---|---|
| PETER PAN INN URBANA, MARYLAND glass<br>Item #470476060<br><br>Notice: This listing is restricted to pre-approved bidders only.<br><br>See if you're allowed to bid on this item<br>Opening bid:      $2.00<br><br>Your maximum bid: [        ]<br><br>(Minimum bid: $2.00)<br><br>▆▆▆▆▆▆<br>510<br><br>eBay will bid incrementally on your behalf up to your maximum bid, which is kept secret from other eBay users. The eBay term for this is proxy bidding.<br><br>Your bid is a contact - Place a bid only if you're serious about buying the item. If you are the winning bidder, you will enter into legally binding contract to purchase the item from the seller. | How to Bid<br>1. Register to bid - if you haven't already. It's free!<br>2. Learn about this seller - read feedback comments left by others.<br>3. Know the details - read the item description and payment & shipping terms closely.<br>4. If you have questions - contact the seller susan1073 *before* you bid.<br>5. Place your bid!<br>eBay purchases are insured. |

Dear <Buyer name>

This item is restricted to pre-approved bidders. You may place a bid once this seller has approved you. In order to get approved, you'll need to contact the seller and request to be added to the pre approved bidder list for this item.

| ITEM NO. | COMMENT | TYPE | DATE | RESPONSE | REBUTTAL | COMMENTATOR |
|---|---|---|---|---|---|---|
| 802 | 804 | 806 | 808 | 810 | 812 | 814 |

METHOD AND SYSTEM TO IMPLEMENT SELLER AUTHORIZED BUYING PRIVILEGES WITHIN A NETWORK-BASED SHOPPING FACILITY

RELATED APPLICATIONS

This application is a continuation application of U.S. Utility application Ser. No. 09/881,911, filed on Jun. 15, 2001 now U.S. Pat. No. 7,299,206, which claims the benefit of U.S. Provisional Application Ser. No. 60/250,637 filed on Nov. 30, 2000, both of which are incorporated by reference herein.

FIELD

The present disclosure relates to electronic commerce. Specifically, the present disclosure provides for a seller to select shoppers to provide buying privileges to buy an offering offered for sale by the seller within a network-based shopping facility such as, for example, an Internet-based shopping facility.

ART BACKGROUND

More and more Internet users are realizing the ease and convenience of buying and selling online by way of person-to-person online trading pioneered by eBay Inc., the assignee of the present disclosure. As a result, collectors, hobbyists, small dealers, unique item seekers, bargain hunters, and other consumers are able to buy and sell millions of items at various online shopping sites.

The success of the online shopping sites, such as the Internet-based shopping facilities, depends upon their ability to provide enjoyable shopping experiences and easy-to-use and reliable environments in which buyers and sellers can conduct business efficiently. The online shopping sites can offer their services by facilitating auctions or by allowing sellers to offer their offerings for fixed prices. The current Internet-based shopping facilities have been presented with public relations risks due to excessive bid retraction and cancellation activities. For example, the reputation of eBay Inc. as a safe trading place was threatened because of the excessive bid retraction and cancellation activities during the recent auction of the Titanic deck chair and other high profile listings. It is estimated that as many as eighty percent of the bids made on the Internet-based shopping facilities are bogus.

In the light of the foregoing, there is a need to enhance the traders' trust of the online shopping facilities. Particularly, it would be valuable and useful to provide a seller with a degree of confidence that a specific shopper is sincere about bidding on the seller's auction listing or offering to buy the seller's fixed price listing.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and system to implement seller authorized buying privileges within a network-based shopping facility are described. The present invention proposes a method and system whereby a seller can select shoppers to provide buying privileges to buy an offering offered for sale by the seller. The buying privileges can include the authorization to bid on the seller's auction listing and the authorization to offer to buy the seller's fixed price listing. A listing may, for example, comprise an item or service offering. In this description, the terms listing, item and offering are used interchangeably. Unauthorized bidders are blocked from bidding on the item.

An advantage of the present disclosure is that the seller does not have to manually monitor shopping activities because only the shoppers pre-approved by the seller are allowed to bid on or offer to buy the seller's listing. The shoppers also benefit from the present disclosure because a healthier trading environment is created because only the pre-approved candidates are allowed to compete with them. The community benefits in general because the shopping facility is perceived to have a safer trading place for the community because only the serious shoppers are allowed to bid on and offer to buy the listings. Seller authorized buying privileges can be requested by any seller with privileges to list on the shopping facility and for any listing, although the sellers with high profile listings would have more interest to do so. The present disclosure is extremely useful for high profile listings: charity listings, special events and holiday promotions.

In the ensuing description, a method and system to implement seller authorized buying privileges within a network-based auction facility are described. It will be appreciated that the method and system are also applicable to the fixed priced listings. In this description, the terms pre-approval and authorization are used interchangeably. In various embodiments, the seller is empowered to use different mechanisms to pre-approve bidders. For example, the seller may view a potential bidder's bidding history and profile to determine whether or not to pre-approve the bidder to bid on a listing. It is understood that if the vetting process is too strict, the conversion rate on the item will be affected. To mitigate, in one embodiment, the auction facility educates the sellers to use proper vetting mechanism to choose their bidders. Also, in one embodiment, the seller may remove the pre-approval restriction anytime during the auction. For example, the seller may wish to take the risk to open the listing to all potential bidders if the pre-approval restriction produces no bids or the bids amounts are low. In one embodiment, the seller may add and remove the pre-approval restriction multiple times during the auction.

In one embodiment, the seller may remove a bidder from the pre-approved list after the seller has added the bidder to the pre-approved list. In one embodiment, the seller may add bidders to and remove bidders from the pre-approved list multiple times during the auction of the listing. In one embodiment, the seller may request the pre-approval of bidders for his/her listing without specifying any bidders initially, and then add the bidders to the pre-approved list from time to time. In one embodiment, the seller has the choice to apply the pre-approve bidders list from a prior or current listing to all ongoing listings with the auction facility and/or any future listings. In one embodiment, the seller may pre-approve the bidders individually or in a bulk. In one embodiment, the seller may view the list of the pre-approved bidders and their respective Usernames/email addresses by logging on to the auction facility web site and providing the listing identification number.

In one embodiment, the bidders within the United States of America as well as international bidders may be pre-approved to bid on the listing. In one embodiment, only the predetermined currencies can be used to bid on a listing.

In the following description, for purposes of explanation, numerous specific details are set forth in order to provide a thorough understanding of the present invention. It will be evident, however, to one skilled in the art that the present invention may be practiced without these specific details.

Terminology/Definitions

Unauthorized bidders include bidders who are not pre-approved by the seller to bid on a particular item. Authorized bidders include bidders who are pre-approved to bid on a particular item by the seller. Items include auction listings. Bidders include bidders and potential bidder.

Auction Facility

Figure 1:
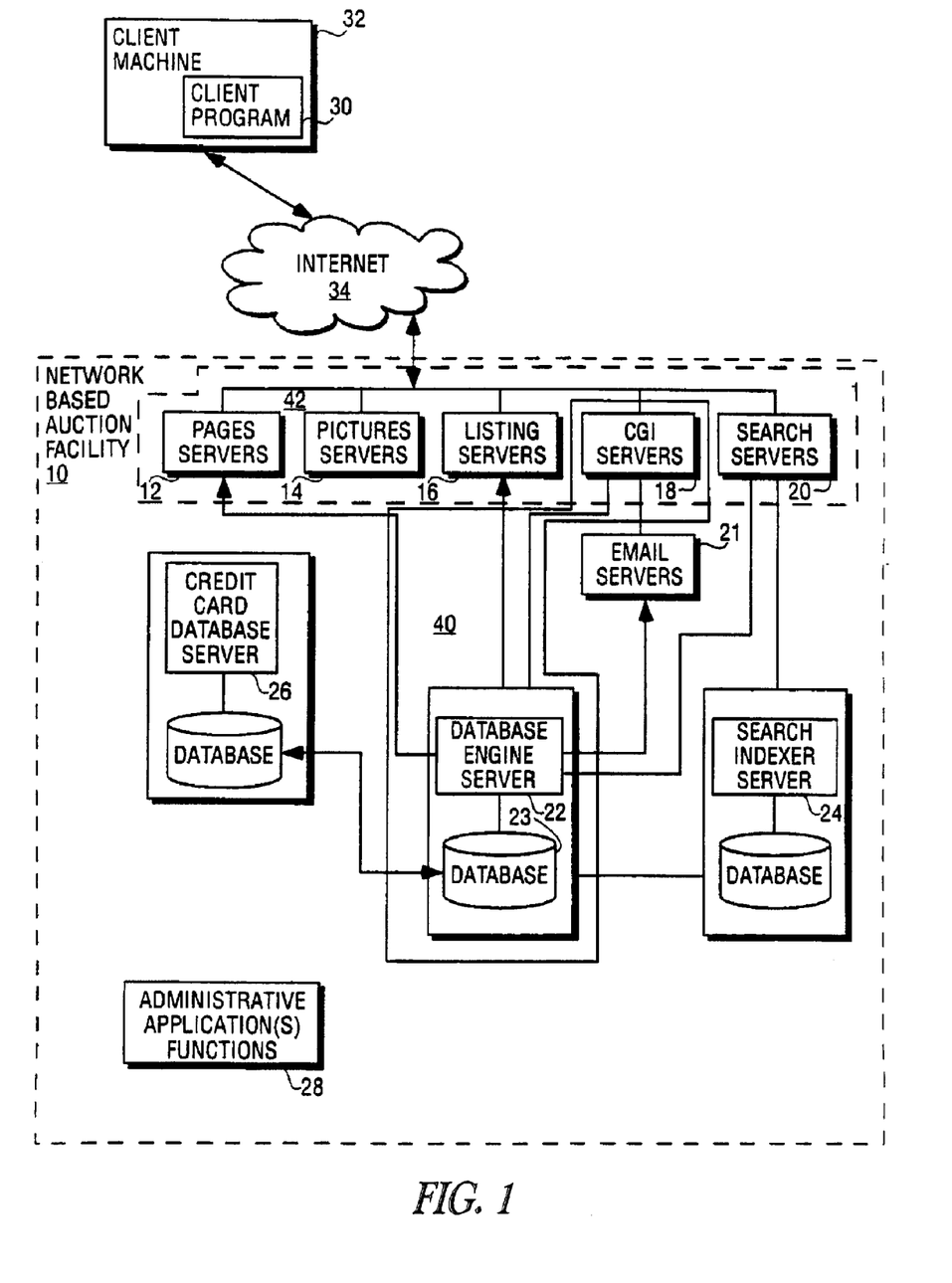
FIG. 1 is block diagram illustrating an exemplary network-based commerce facility in the form of an Internet-based auction facility 10.

FIG. 1 is block diagram illustrating an exemplary network-based commerce facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility includes an authorization module 40 and a communications module 42. The authorization module 40 includes the CGI servers 18 that provide an intelligent interface to the back-end of facility 10, database engine server 22 and database 23. The communications module 42 includes one or more of a number of types of front-end servers, namely the page servers 12 that deliver web pages (e.g., markup language documents), picture servers 14 that dynamically deliver images to be displayed within Web pages, listing servers 16, CGI servers 18, and search servers 20 that handle search requests to the facility 10. E-mail servers 21 provide, inter alia, automated e-mail communications to the users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. The sellers and the buyers (or bidders) access the auction facility through the client machines 32. Other examples of networks that a client may utilize to access the auction facility 10 include a wide area network (WAN), a local area network (LAN), a wireless network (e.g., a cellular network), or the Plain Old Telephone Service (POTS) network.

Figure 2:
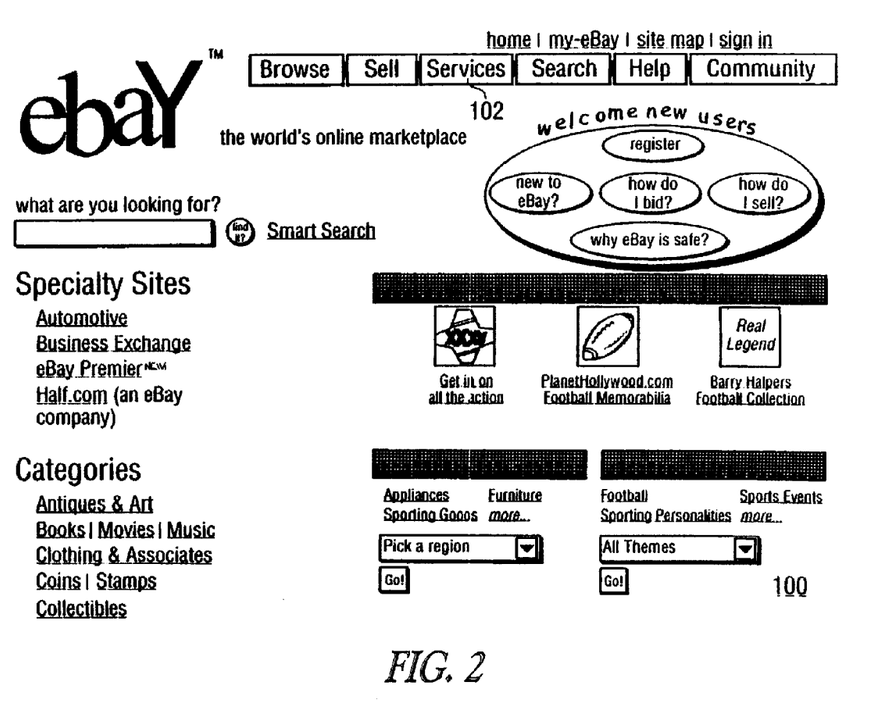
FIG. 2 illustrates the web home page for an exemplary Internet-based auction facility.

FIG. 2 illustrates the web home page for an exemplary Internet-based auction facility. The home page 100 includes a "seller services" link 102, which provides access to the seller services page. The seller services page, in turn, includes a buying and selling tools link, which provides access to the buying and selling tools page. The buying and selling tools page, in turn, includes a pre-approve bidders link, which provides access to the pre-approve bidders logon web page.

Figure 3:
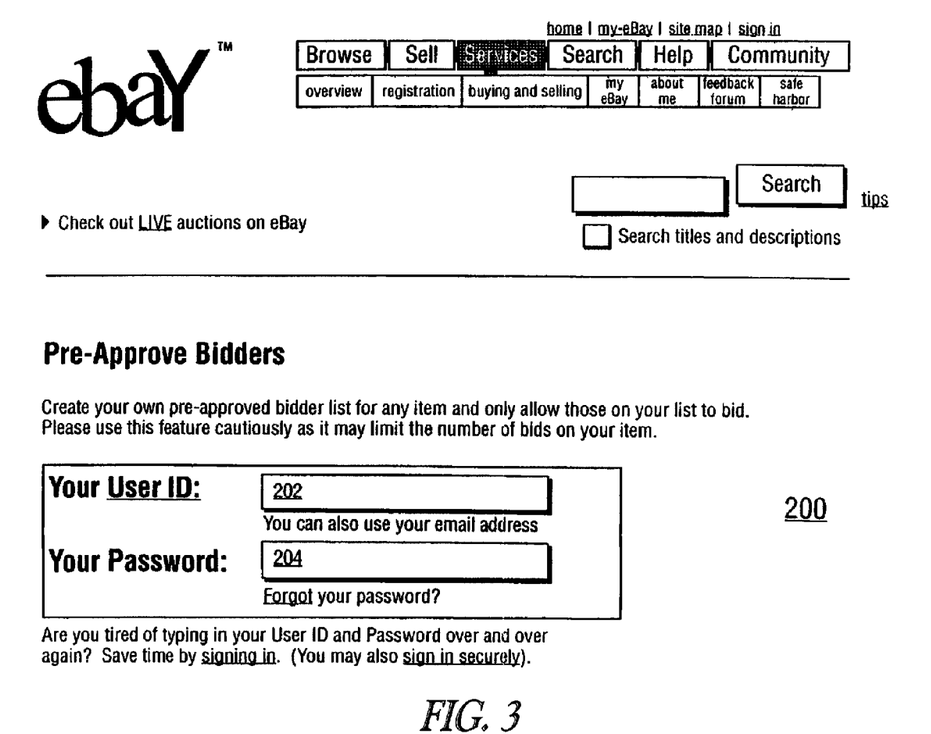
FIG. 3 illustrates the pre-approve bidders main web page for an exemplary Internet-based auction facility.

FIG. 3 illustrates the pre-approve bidders logon web page for an exemplary Internet-based auctions facility. The pre-approve logon page 200 prompts the seller to provide a proper username 202 and password 204. When the seller provides the proper username 202 and password 204, the logon page 200 provides access to the pre-approve bidders main web page.

Figure 4:
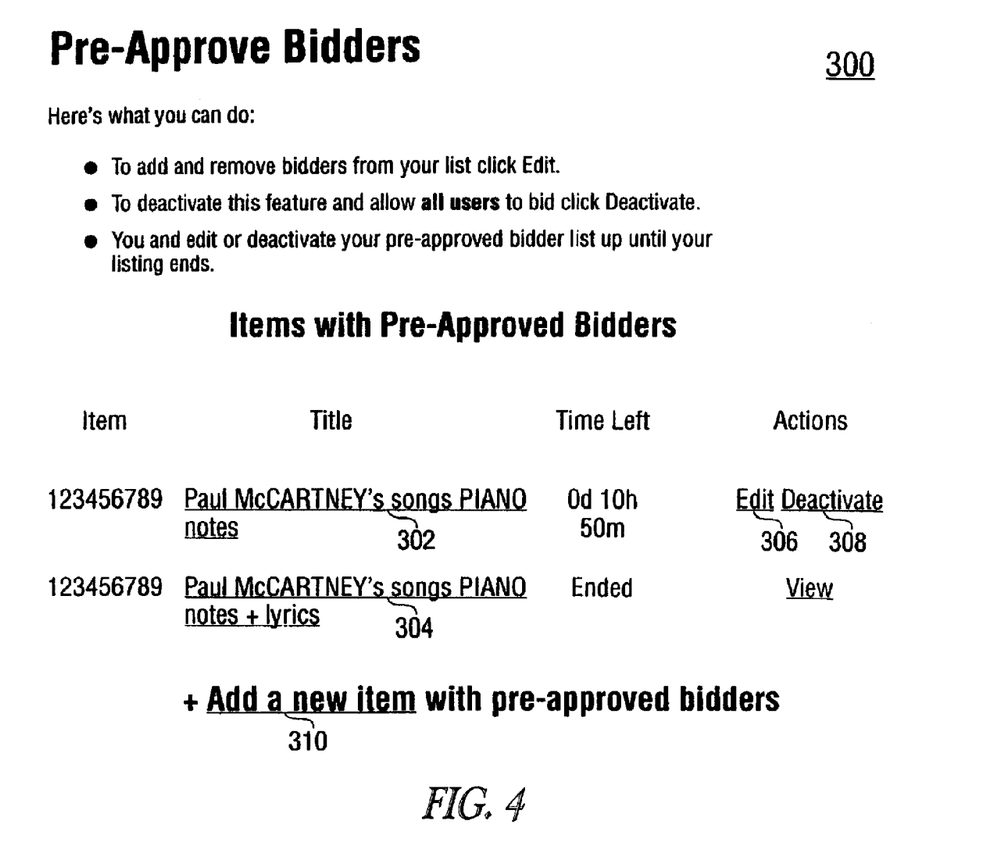
FIG. 4 illustrates the pre-approve bidders logon web page for an exemplary Internet-based auctions facility.

FIG. 4 illustrates the pre-approve bidders main web page for an exemplary Internet-based auction facility. The pre-approve bidders main page 300 displays the currently active 302 and the past 304 auction listings for the particular seller. The pre-approve bidders main page 300 includes an "edit" link 306, which allows the seller to edit the pre-approve bidders list for the corresponding listing 302. The editing can include adding bidders to or subtracting bidders from the pre-approve bidders list. The pre-approve bidders main page 300 also includes a "deactivate" link 308, which allows the seller to deactivate the pre-approve bidders list such that the shoppers need not seek the seller's authorization to bid on the listing. If the seller removes the pre-approval restriction during the auction, the auction facility 10 requests the seller to inform the pre-approved bidders that the listing is now available to all potential bidders. In one embodiment, the seller can inform the pre-approved bidders of the removal of the pre-approval restriction through email. The pre-approve bidders main page 300 also includes an "add a new item" link 310, which provides access to the pre-approve bidders form page.

Figure 5:
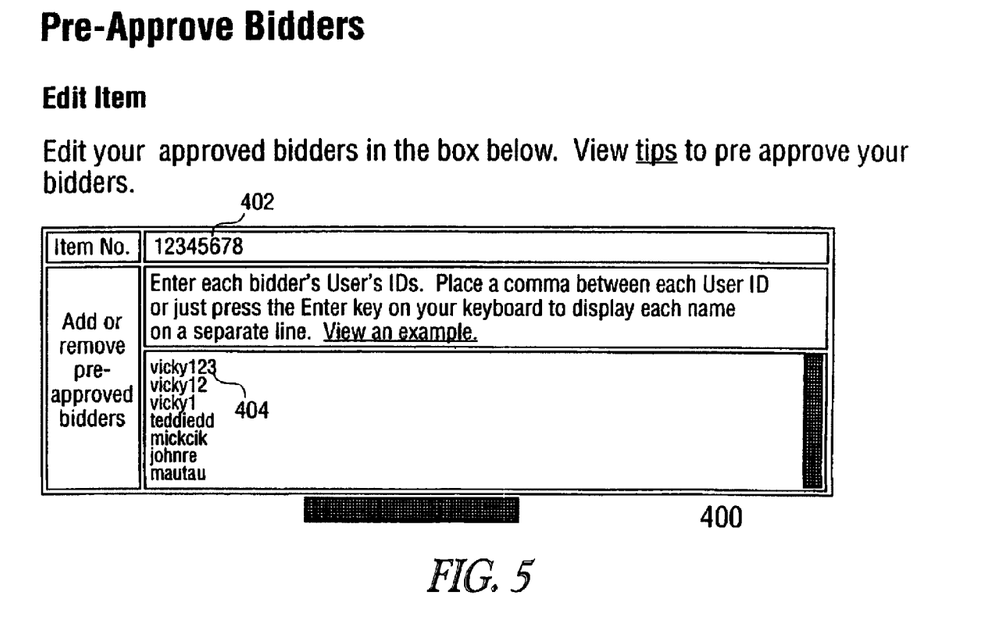
FIG. 5 illustrates the pre-approve bidders form web page for an exemplary Internet-based auctions facility.
Figure 6A:
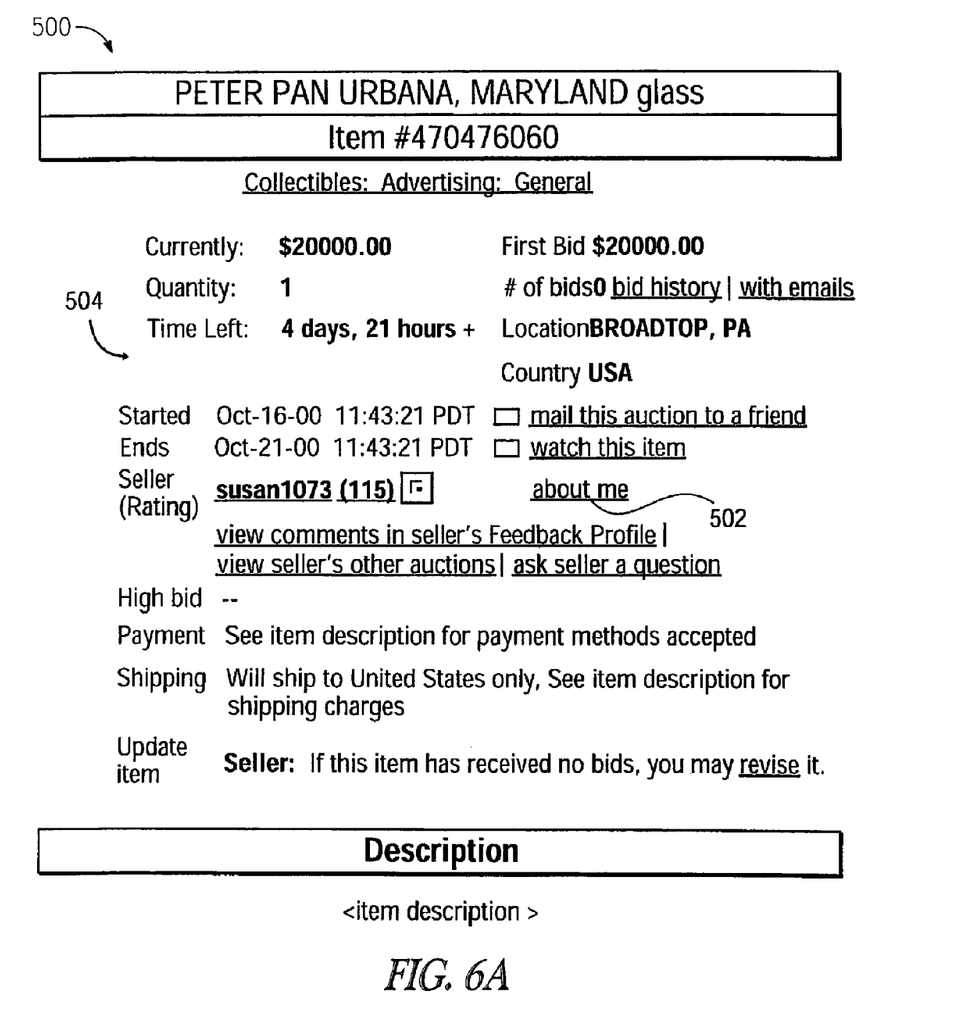
FIGS. 6A and 6B illustrate the view item web page for an exemplary Internet-based auction facility.
Figure 6B:
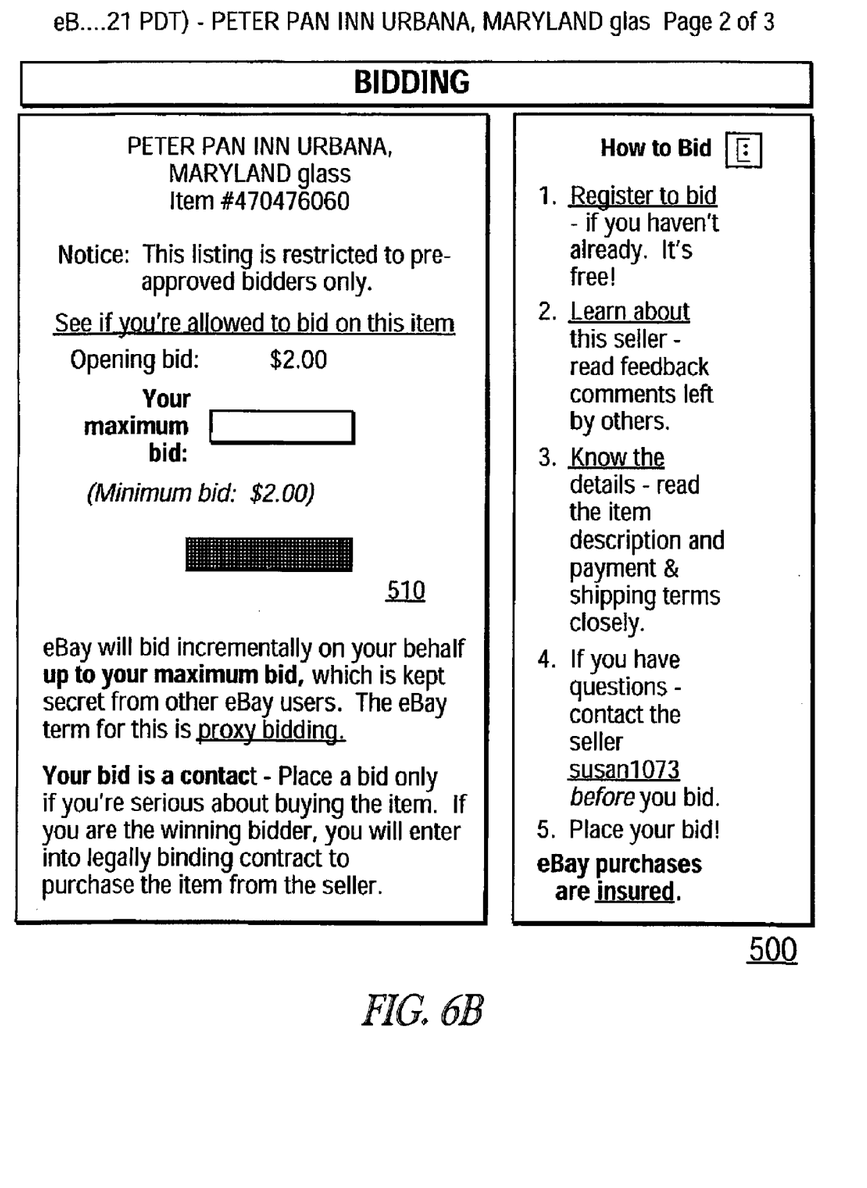

FIG. 5 illustrates the pre-approve bidders form web page for an exemplary Internet-based auction facility. The pre-approve bidders form page 400 prompts the seller to provide an item number 402. The item number 402 can be provided by the auction facility 10 and corresponds to the item for which the seller wishes to pre-approve the bidders. The form page 400 also prompts the seller to add or remove the identifiers 404 for the bidders whom the seller wishes to authorize to bid on the particular item. The identifier 404 can include the bidder Username. The bidders identifiers 404 that are added to the form page 400 are stored in the authorized bidders table described below with reference to FIG. 7. The view item web page described below with references to FIGS. 6A and 6B is updated to include the information submitted through the form page 400. In one embodiment, if the seller's username 302 does not match with the item number 402, the auction facility 10 prompts an error message asking the seller to recheck the item number 402. In one embodiment, if the Username for the bidder does not match with a Username in the bidder table in the database 23, the auction facility 10 prompts an error message indicating that the bidder is not registered, suspended, terminated or merged.

Figure 6C:
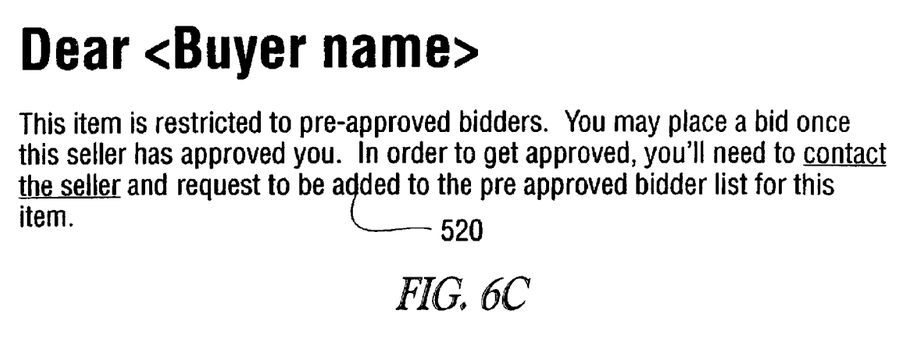
FIG. 6C illustrates an exemplary error message.

FIGS. 6A and 6B illustrate the view item web page for an exemplary Internet-based auction facility. If the seller has requested pre-approval restriction for the item, the auction facility 10 flashes an error message 520 when the unauthorized bidders attempt to bid on the item. An exemplary error message 520 is illustrated in FIG. 6C. The error message 520 informs the unauthorized bidder to contact the seller to seek the pre-approval to bid. The error message 520 can appear in the bidder box area 510. In one embodiment, if the potential bidder is on the pre-approve bidders list to bid on this item, the auction facility 10 prompts him/her with a message to continue with the bidding process.

The view item page 500 includes an "about me" page link 502, which provides access to the about me web page. The unauthorized bidders may visit the about me page for more details regarding the seller including the seller's vetting process/guidelines. In one embodiment, the "about me" page link 502 is added in the item description area 504. In one embodiment, when the seller removes the pre-approval restriction, the restricted message is removed from the bid box area. In one embodiment, the seller can request pre-approval restriction after the auction has begun for the remaining time on the auction. In such a case, in one embodiment, the seller can manually cancel the bids made prior to the implementation of the pre-approval restriction.

Database Structure

The auction facility 10 provides the seller with information regarding the potential bidder such that the seller can make an informed determination regarding whether to pre-approve the bidder. The information may include the bidder's bidding history and feedback profile. The information is included in the database 23. In one embodiment, the seller provides the auction facility 10 with the bidder contact information to obtain information regarding the bidder. The bidder contact information can include the bidder Username or email address. The seller may obtain the bidder contact information through the bidder or the auction facility 10. In one embodiment, the auction facility 10 matches the contact information provided by the seller with the contact information stored in the database 23 to provide the seller with user information.

Figure 7:
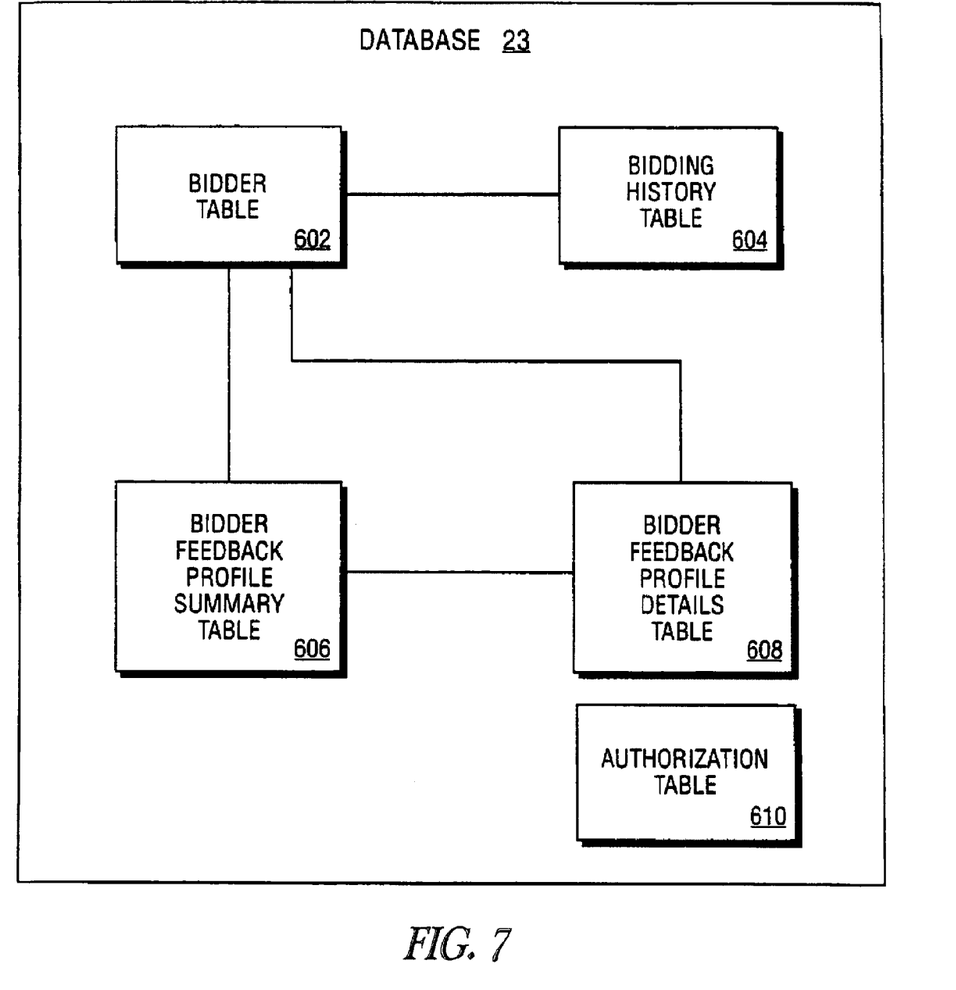
FIG. 7 is a database diagram illustrating an exemplary database for the Internet-based auction facility.

FIG. 7 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

The database 23 includes a bidder table 602, which contains a listing of the registered bidders of the auction facility 10. The bidder table 602 can also be referred to as the user table because each user may operate as both a bidder and a seller within the auction facility 10. The bidder table includes a link to a bidding history table 604 for each registered bidder. Each bidding history table 604 is populated with the particular bidder's bidding history records. Each bidding history record may include, inter alia, the title of a listing that was/is being auctioned via the auction facility 10, the bidder's bidding amount, and bid retraction information. The bid retraction information indicates whether the bidder retracted his/her bid on a particular item. Two other tables are also shown linked to the bidder table 602, namely a bidder feedback profile summary table 606 and a bidder feedback profile details table 608. The database 23 also includes an authorized bidders table 610 for each item for which the seller has requested the pre-approval of the bidders. The authorized bidders table 610 includes the list of bidders identifiers 404 that are authorized to bid on the particular item. The bidder identifier 404 can include the bidder Username.

Figure 8:
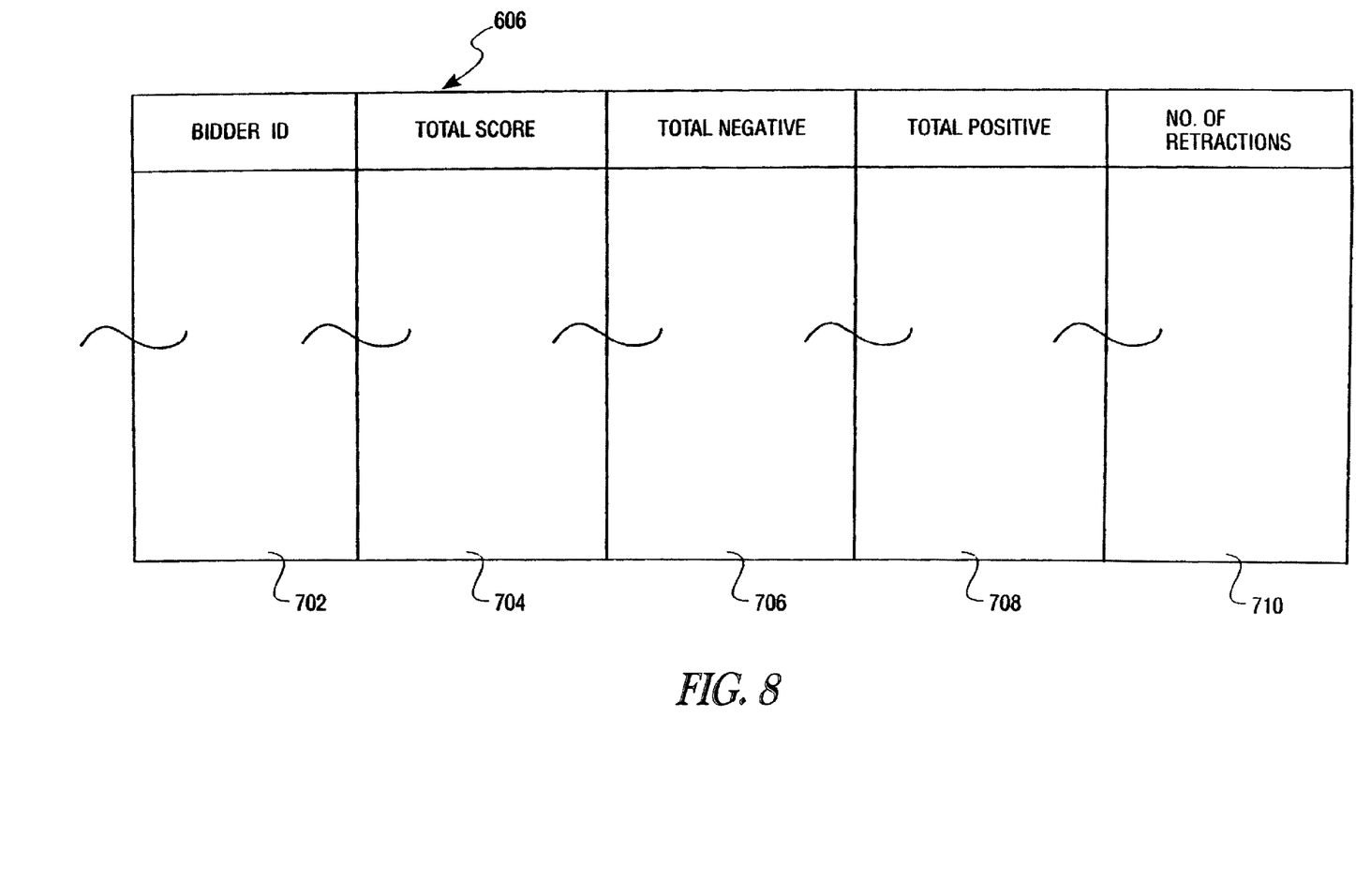
FIG. 8 is a diagrammatic representation of an exemplary embodiment of the bidder feedback profile summary table.

FIG. 8 is a diagrammatic representation of an exemplary embodiment of the bidder feedback profile summary table 606. The summary table 606 stores a summary of the feedback information regarding the bidders. Sellers and bidders that have experienced a particular bidder's behavior during the past auctions provide the feedback information (or comments) regarding to the bidder. The summary table 606 includes a bidder identifier column 702 that stores, for each bidder, a bidder identifier providing a pointer to the bidder table 602. The total score column 704 stores the total number of feedback comments (e.g., negative, positive and neutral) received for each bidder. The total negative column 706 stores the total number of negative feedback comments received for each bidder, and the total positive column 708 similarly stores the total number of positive feedback comments received for each bidder. The number of retractions column 710 stores the total number of threads that each bidder has retracted from auctions.

The summary table 606 provides a good summary of the impressions of the users of the auction facility 10 regarding a particular bidder. Each bidder of the summary table 606 is linked to a bidder feedback profile details table 608. It is contemplated that other embodiments of the summary table 606 can include additional information such as whether the bidder has a credit card on file with the auction facility and whether the bidder is agreeable to use an online payment service (e.g., Billpoint).

Figure 9:
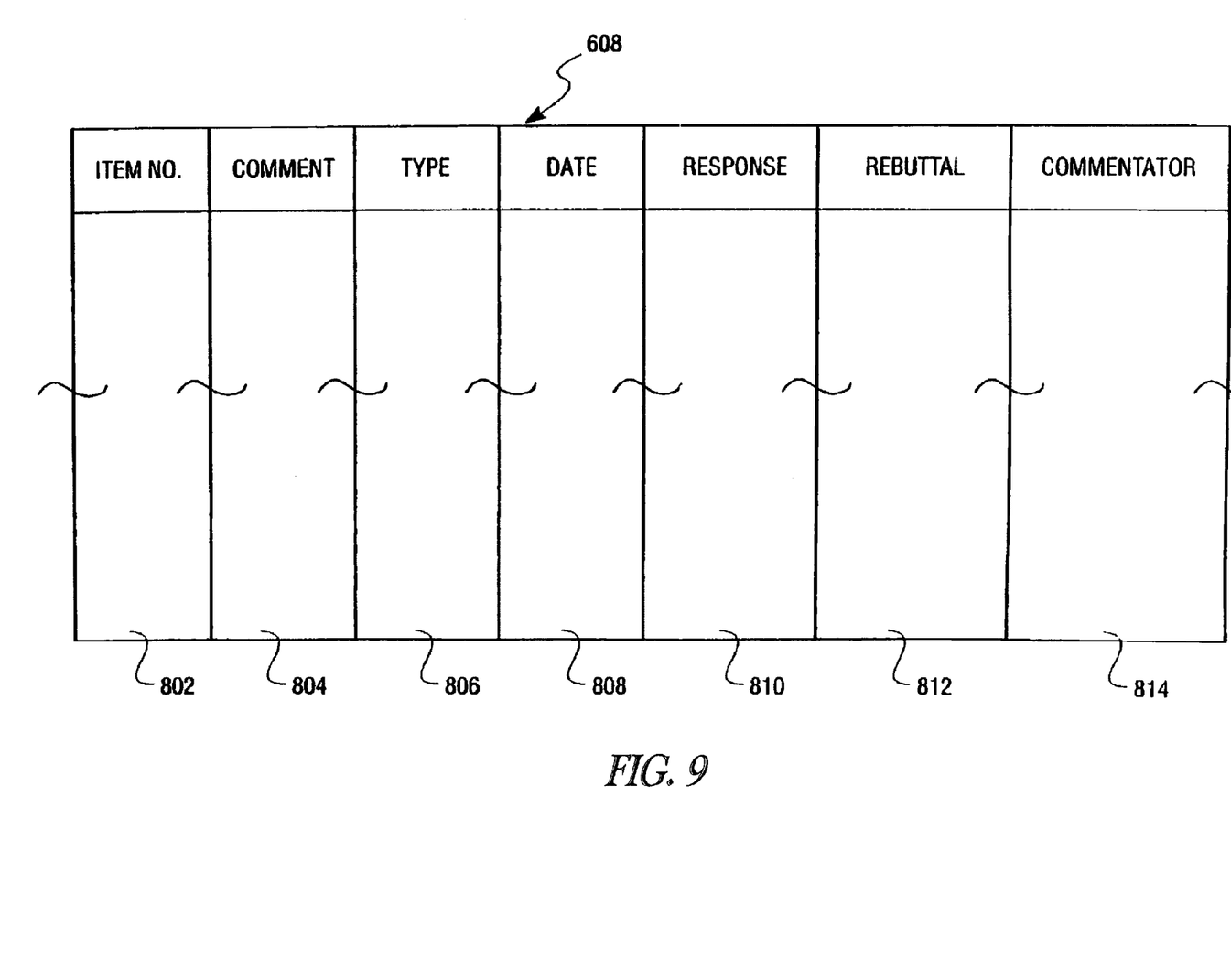
FIG. 9 is a diagrammatic representation of one exemplary embodiment of the bidder feedback profile details table.

FIG. 9 is a diagrammatic representation of one embodiment of the bidder feedback profile details table 608. The details table 608 is populated with entries reflecting the details of each feedback comment or opinion submitted by a user to the auction facility 10 regarding a particular bidder. Typically, the users submitting the comments include sellers on whose auction listings the bidder has bid in the past. In one exemplary embodiment, the users are only permitted to provide feedback pertaining to a transaction upon conclusion of that transaction. The feedback details table 608 includes the item number column 802 that identifies the items for which the comments were submitted. The comment column 804 stores the actual texts of the feedbacks, comments, or opinions. The type column 806 stores the indications as to whether the comments are positive, negative or neutral. The date column 808 stores the dates on which the feedbacks, comments or opinions were received. The response column 810 stores the texts of the responses submitted by the bidder in response to the comments texts stored in column 804. Similarly, the rebuttal column 812 stores the texts of the rebuttals to such responses. The commentator column 814 stores the identifiers of the users that submitted the original comments stored in column 804. It is appreciated that further dates and other descriptive information may also populate the details table 608.

The tables 602, 604, 606 and 608 include information that can provide the seller with valuable insights to evaluate the potential bidders. In one embodiment, the information contained in the tables 602, 604, 606 and 608 is easily accessible to the sellers. In one embodiment, the seller can provide the bidder's identifier such as the Username or email address to access the information stored in the tables 602, 604, 606 and 608. It is contemplated that the databases of alternate embodiments can include additional tables that provide additional bidders related information.

Figure 10:
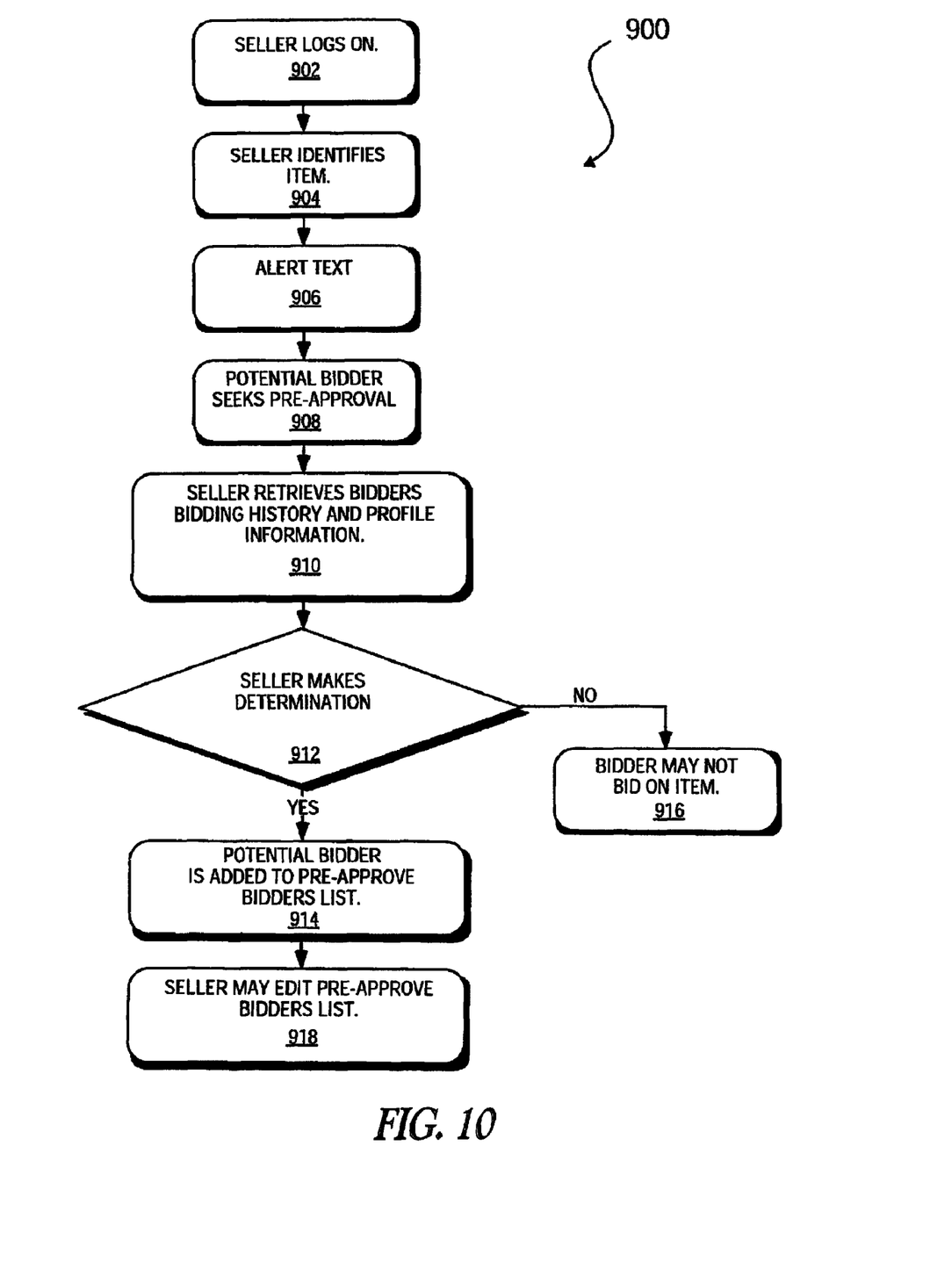
FIG. 10 illustrates the flow chart of one embodiment of the method for seller authorized bidding through an Internet-based auction facility.

FIG. 10 illustrates the flow chart of one embodiment of the method for seller authorized bidding through an Internet-based auction facility. It will be appreciated by those skilled in the art that with certain modifications the method is applicable in many different types of computer-based, and network-based, commerce facilities.

At block 902, a seller registered with the auction web site logs on to the site. If the seller were already logged on, then he/she need not logon again to use request the pre-approval restriction. The suspended, merged, or terminated seller who cannot use any other feature on the auction site is prohibited from using the seller authorized bidding feature. At block 904, the seller identifies the item for which he wishes to add the pre-approval restriction. At block 906, an alert text appears on the item web page to alert the potential bidders to get a pre-approval from the seller to bid on the item. The item web page or another web page linked to the item web page provides the potential bidder with the seller contact information and vetting process information. At block 908, the potential bidder contacts the seller and requests permission to bid on the item. It is understood that the bidder must be registered with and logged on to the auction web site. The bidder provides the seller with the bidder auction site identifier such as the Username or email address. At block 910, the seller uses the bidder's auction site identifier to retrieve the bidder's bidding history and profile information. At block 912, the seller determines whether to add the bidder to the pre-approve bidders list. At block 914, if the determination is positive, the seller adds the potential bidder identifier to the pre-approve bidders list. The bidder identifier is then added to an appropriate authorization table. At block 916, if the determination is negative, the bidder identifier is not added to the authorization table. In one embodiment, the potential bidder is informed through email that the seller has rejected his/her request for pre-approval. At block 918, the seller may edit the pre-approve bidder list. The editing can include the addition of the potential bidder to the list that was rejected at block 912. The editing can also include the removal of a bidder from the list.

When a bidder tried to bid on an item, the authorization module checks whether the bidder identifier is included in the item authorization table. If the bidder identifier is included in the authorization table, the bidder is allowed to bid on the item. If the bidder identifier is not included in the item authorization table, the bidder receives an error message.

Thus, a method and system to implement seller authorized bidding within a network-based auction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In addition, the methods as described above can be stored in memory of a computer system as a set of instructions to be executed. Also, the instructions to perform the methods as described above could alternatively be stored on other forms of computer-readable mediums, including magnetic and optical disks. For example, the method of the present invention can be stored on computer-readable mediums, such as magnetic disks or optical disks that are accessible via a disk drive (or computer-readable medium drive).

What is claimed is:

1. A method including:
    receiving a bid for a particular item that is described by a sales listing from a first bidder that is not pre-approved to bid on the particular item that is described by the sales listing, the receiving done at least in part through the use of one or more processors;
    restricting the bid for the particular item that is described by the sales listing from a bidding process associated with the particular item that is described by the sales listing, the restricting being based on a requirement that the first bidder be pre-approved to bid on the particular item that is described by the sales listing and identifying the first bidder as not being pre-approved, the restricting done at least in part through the use of one or more processors; and
    communicating error information, over a network, to the first bidder, the error information indicating that bidding on the item is restricted to pre-approved bidders, the communicating done at least in part through the use of one or more processors.

2. The method of claim 1, wherein the error information informs the first bidder to contact a seller to seek pre-approval to bid on the particular item that is described by the sales listing.

3. The method of claim 1, including retrieving information for the seller after the first bidder seeks pre-approval from a seller to bid on the particular item that is described by the sales listing, the information to facilitate the seller in determining whether to authorize the first bidder to bid on the particular item that is described by the sales listing.

4. The method of claim 2, wherein the retrieving of the information includes receiving an auction site identifier that identifies the first bidder.

5. The method of claim 4, wherein the auction site identifier includes at least one of a username for the first bidder or an email address for the first bidder.

6. The method of claim 3, wherein the information is one of a bidding history associated with the first bidder or profile information associated with the first bidder.

7. The method of claim 6, wherein the bidding history includes bid retraction information that indicates whether the first bidder retracted a bid on a different and particular sales listing.

8. The method of claim 6, wherein the profile information includes feedback information for a transaction in which the first bidder entered a bid.

9. The method of claim 1, including receiving an authorization from the seller to authorize the bidder to bid on the particular item that is described by the sale listing that is listed for sale by the seller.

10. A non-transitory machine-readable medium storing instructions that, when executed by a machine, cause the machine to:
    receive a bid for a particular item that is described by a sales listing from a first bidder that is not pre-approved to bid on the particular item that is described by the sales listing;
    restrict the bid for the particular item that is described by the sales listing from a bidding process associated with the particular item that is described by the sales listing, the restriction based on a requirement that the first bidder is pre-approved to bid on the particular item that is described by the sales listing and an identification of the first bidder as not being pre-approved; and
    communicate error information, over a network, to the first bidder, the error information indicates that bidding on the item is restricted to pre-approved bidders.

11. A method including:
    receiving an offer to buy a particular item that is described by a sales listing from a first buyer that is not pre-approved to buy the particular item that is described by the sales listing, the receiving done at least in part through the use of one or more processors;
    refusing the offer to buy the particular item that is described by the sales based on a requirement that the first buyer is pre-approved to buy the particular item that is described by the sales listing and identifying the first buyer as not being pre-approved, the refusing done at least in part through the use of one or more processors, communicating error information, over a network, to the first buyer, the error information indicating that offers to buy the particular item are being restricted to pre-approved buyers, the communicating done at least in part through the use of one or more processors.

12. The method of claim 11, wherein the error information informs the first buyer to contact the seller to seek pre-approval to buy the particular item that is described by the sales listing.

13. The method of claim 11, including retrieving information for the seller after the first buyer seeks pre-approval from the seller to buy the particular item that is described by the sales listing, the information to facilitate the seller in determining whether to authorize the buyer to buy the particular item that is described by the sales listing.

14. The method of claim 13, wherein the retrieving of the information includes receiving an auction site identifier that identifies the first buyer.

15. The method of claim 14, wherein the auction site identifier includes at least one of a username for the first buyer or an email address for the first buyer.

16. The method of claim 13, wherein the information is one of a bidding history associated with the first buyer or profile information associated with the first buyer.

17. The method of claim 16, wherein the bidding history includes bid retraction information that indicates whether the first buyer retracted a bid on a different and particular sales listing.

18. The method of claim 16, wherein the profile information includes feedback information for a transaction in which the first buyer entered a bid.

19. The method of claim 11, including receiving an authorization from the seller to authorize the buyer to buy the particular item that is described by the sale listing that is listed for sale by the seller.

20. A non-transitory machine-readable medium storing instructions that, when executed by a machine, cause the machine to:
 receive an offer to buy a particular item that is described by a sales listing from a first buyer that is not pre-approved to buy the particular item that is described by the sales listing;
 refuse an offer to buy the particular item that is described by the sales listing based on a requirement that the first buyer is pre-approved to buy the particular item that is described by the sales listing and an identification of the first buyer as not pre-approved,
 communicate error information, over a network, to the first buyer, the error information indicating that offers to buy the particular item are restricted to a pre-approved buyers.

\* \* \* \* \*